(12) United States Patent
Brown et al.

(10) Patent No.: US 10,576,937 B2
(45) Date of Patent: Mar. 3, 2020

(54) AIRCRAFT WINDSHIELD WIPER INSTALLATION SYSTEM

(71) Applicant: THE BOEING COMPANY, Chicago, IL (US)

(72) Inventors: Myles Edward Brown, Bothell, WA (US); Hector Eduardo Iturribarria Bazaldua, Seattle, WA (US); Olubusola Anthony Dasilva, Silver Springs, MD (US)

(73) Assignee: The Boeing Company, Chicago, IL (US)

( * ) Notice: Subject to any disclaimer, the term of this patent is extended or adjusted under 35 U.S.C. 154(b) by 314 days.

(21) Appl. No.: 15/634,082

(22) Filed: Jun. 27, 2017

(65) Prior Publication Data

US 2018/0370491 A1 Dec. 27, 2018

(51) Int. Cl.
| | | |
|---|---|---|
| *B60S 1/08* | (2006.01) | |
| *B60S 1/04* | (2006.01) | |
| *B60S 1/18* | (2006.01) | |
| *B60S 1/16* | (2006.01) | |
| *B64C 1/14* | (2006.01) | |

(52) U.S. Cl.
CPC ............... *B60S 1/08* (2013.01); *B60S 1/0452* (2013.01); *B60S 1/0469* (2013.01); *B60S 1/163* (2013.01); *B60S 1/185* (2013.01); *B64C 1/1484* (2013.01)

(58) Field of Classification Search
CPC ...... B60S 1/04; B60S 1/06; B60S 1/08; B60S 1/3418; B60S 1/163; B60S 1/0469; B60S 1/0452; B64C 1/1484; B64C 1/14
USPC ................... 15/250.001, 257.01; 701/36, 49; 318/DIG. 2; 180/315; 244/129.3, 1 R
See application file for complete search history.

(56) References Cited

U.S. PATENT DOCUMENTS

| | | | | |
|---|---|---|---|---|
| 2009/0248243 A1* | 10/2009 | Kwon | ....................... | B60S 1/08 |
| | | | | 701/36 |
| 2013/0245895 A1* | 9/2013 | Hogler | ....................... | B60S 1/08 |
| | | | | 701/49 |
| 2019/0118775 A1* | 4/2019 | Koberstaedt | .......... | B60S 1/0461 |

FOREIGN PATENT DOCUMENTS

| | | |
|---|---|---|
| CN | 203047183 | 7/2013 |
| CN | 204659672 | 9/2015 |
| DE | 102014223277 | 5/2016 |
| EP | 1803618 | 7/2007 |

(Continued)

OTHER PUBLICATIONS

Extended European Search Report for EP Application No. 18173951.7-1015, dated Oct. 22, 2018.

*Primary Examiner* — Gary K. Graham

(74) *Attorney, Agent, or Firm* — Joseph M. Butscher; The Small Patent Law Group, LLC

(57) ABSTRACT

A windshield wiper installation system is configured to be used to install a wiper on a windshield of an aircraft. The windshield wiper installation system includes a housing, an installation control unit contained within the housing, at least one positioning member secured to the housing, wherein the installation control unit is operatively coupled to the positioning member(s), and at least one position-setting member secured to the housing, wherein the installation control unit is operatively coupled to the position-setting member(s). The positioning member(s) is configured to be engaged to move the wiper to one or more desired positions on the windshield. The position-setting member is configured to set the desired position(s) when the wiper is at the desired position(s).

20 Claims, 5 Drawing Sheets

(56) References Cited

FOREIGN PATENT DOCUMENTS

| EP | 2783926 | 10/2014 |
| FR | 2949408 | 3/2011 |
| WO | 2009/135820 | * 11/2009 |

* cited by examiner

AIRCRAFT WINDSHIELD WIPER INSTALLATION SYSTEM

FIELD OF THE DISCLOSURE

Embodiments of the present disclosure generally relate to systems and methods for installing aircraft windshield wipers.

BACKGROUND OF THE DISCLOSURE

Various vehicles such as commercial aircraft include cockpits that define an internal operating environment and one or more windshields that shield the cockpit from an outside environment. Windshield wipers are operatively connected to windshields and are configured to wipe water, ice, and the like from the windshields.

During a manufacturing process for an aircraft, a windshield wiper is installed (for example, rigged) in relation to a windshield of the aircraft. Typically, a windshield wiper of an aircraft is installed by supervised and experienced mechanics. Nevertheless, at a later date, the windshield wiper may be removed, such as when an aircraft is painted. The windshield wiper may then be reinstalled by personnel other than specially-trained wiper installation mechanics.

A known windshield wiper system includes an electric motor, a converter, and a windshield wiper. The converter reduces a rotary output speed of the motor and converts it into an oscillating motion through a four linkage mechanism driving the arm and wiper blade back and forth across the windshield.

In order to install (for example, rig) the known windshield wiper system, a bushing is positioned on an outward shaft of the converter. The bushing includes teeth on an outer edge that match the pattern on a wiper arm hub, thereby allowing the bushing and the wiper arm hub to rotate together during operation. After the wiper arm hub is positioned on the bushing, a wiper arm hub bolt is tightened. Then, the wiper arm is raised up to a lift block assembly, so the wiper arm sits on a lift block assembly.

If the wiper arm is raised up to the lift block assembly with too much force, a park position may be inadvertently defined below the lift bock assembly. As such, during operation, when the wiper is signaled to park, the wiper arm may collide with the lift block assembly as the motor forces the wiper past the lift block assembly to an incorrect park position. Conversely, if the wiper arm is raised up to the lift block assembly with insufficient force, the park position may be defined above the lift bock assembly causing the wiper to insufficiently park in relation to the lift block assembly.

To verify proper installation, a mechanic sprays water on the windshield and activates the wiper. As the windshield wiper moves, the mechanic checks that a lower sweep limit of the wiper is between two lines on a piece of tape the mechanic previously placed on the windshield, as per instructions in an installation manual. Additionally, the mechanic checks that the windshield wiper parks correctly. If the mechanic determines that the windshield wiper does not satisfy operational requirements, the mechanic removes the wiper arm and the bushing form the outward shaft, rotates the bushing accordingly, and then repeats the installation process. The amount of rotation of the bushing for proper rigging may be intuitive for an experienced mechanic. However, an unexperienced mechanic may have to rely on trial and error, thereby prolonging the installation process.

As can be appreciated, the wiper installation or rigging process is labor and time intensive, complex, and is typically performed by mechanics who are specifically trained in such process.

SUMMARY OF THE DISCLOSURE

A need exists for a simple and efficient system and method of installing a windshield wiper on a windshield of an aircraft. Further, a need exists for a quicker and easier process of installing a wiper in relation to a windshield of an aircraft.

With those needs in mind, certain embodiments of the present disclosure provide a windshield wiper installation system that is configured to be used to install a wiper on a windshield of an aircraft. The windshield wiper installation system includes a housing, an installation control unit contained within the housing, at least one positioning member secured to the housing (wherein the installation control unit is operatively coupled to the positioning member(s)), and at least one position-setting member secured to the housing (wherein the installation control unit is operatively coupled to the position-setting member(s)). The positioning member(s) is configured to be engaged to move the wiper to one or more desired positions on the windshield. The position-setting member(s) is configured to be engaged to set the desired position(s) when the wiper is at the desired position(s).

The one or more desired positions may include a plurality of desired positions. In at least one embodiment, the plurality of desired positions include a lower limit position of the wiper on the windshield, an upper limit position of the wiper on the windshield, and a park position of the wiper in relation to the windshield. A park lock may be used to secure the wiper in the park position.

In at least one embodiment, the installation control unit is in communication with an actuator that is coupled to the wiper through a gearbox. The installation control unit is configured to operate the actuator to move the wiper based on signals received from the positioning member(s). The installation control unit may be configured to be removably coupled to the actuator through one or more electrical couplings. In at least one embodiment, the actuator includes a stepper motor. In at least one other embodiment, the actuator includes an electric torque motor.

A first position-setting member may be associated with a first desired position. A second position-setting member may be associated with a second desired position. A third position-setting member may be associated with a third desired position.

The windshield wiper installation system may also include at least one speed member that is configured to control a speed of the wiper. The windshield wiper installation system may also include at least one power member that is configured to selectively activate and deactivate the windshield wiper installation system.

Certain embodiments of the present disclosure provide an aircraft that includes a fuselage including an internal cockpit, a windshield that shields the internal cockpit from an outside environment, at least one wiper mounted to the windshield, at least one actuator that is coupled to the wiper(s) through at least one gearbox, and a windshield wiper installation system that is configured to be used to install the wiper(s) on the windshield of the aircraft.

Certain embodiments of the present disclosure provide a windshield wiper installation method that is configured to be used to install a wiper on a windshield of an aircraft. The windshield wiper installation method includes using at least one positioning member that is in communication with an installation control unit contained within a housing to move the wiper to a plurality of desired positions on the windshield, and using at least one position-setting member that is in communication with the installation control unit to set the plurality of desired positions when the wiper is placed at the plurality of desired positions. The plurality of desired positions include a lower limit position of the wiper on the windshield, an upper limit position of the wiper on the windshield, and a park position of the wiper in relation to the windshield.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide a windshield wiper installation (for example, rigging) system for an aircraft. In at least one embodiment, the windshield wiper installation system is in electrical communication with an actuator (such as a stepper motor, an electric torque motor, or a linear induction motor) that operatively connects to a gearbox, such as a planetary gearbox. The gearbox operatively connects to a windshield wiper. During installation, the windshield wiper system is operated to define a plurality of positions. For example, an upper limit position, a lower limit position, and a park position are defined. The actuator may then be alternated between sending upper and lower limit position signals to the stepper motor resulting in a sweeping motion of the windshield wiper. A locking member (such as a clip, ratchet gear and pawl, solenoid lock, and/or the like) may be used to secure the windshield wipers in the parked position.

Figure 1:
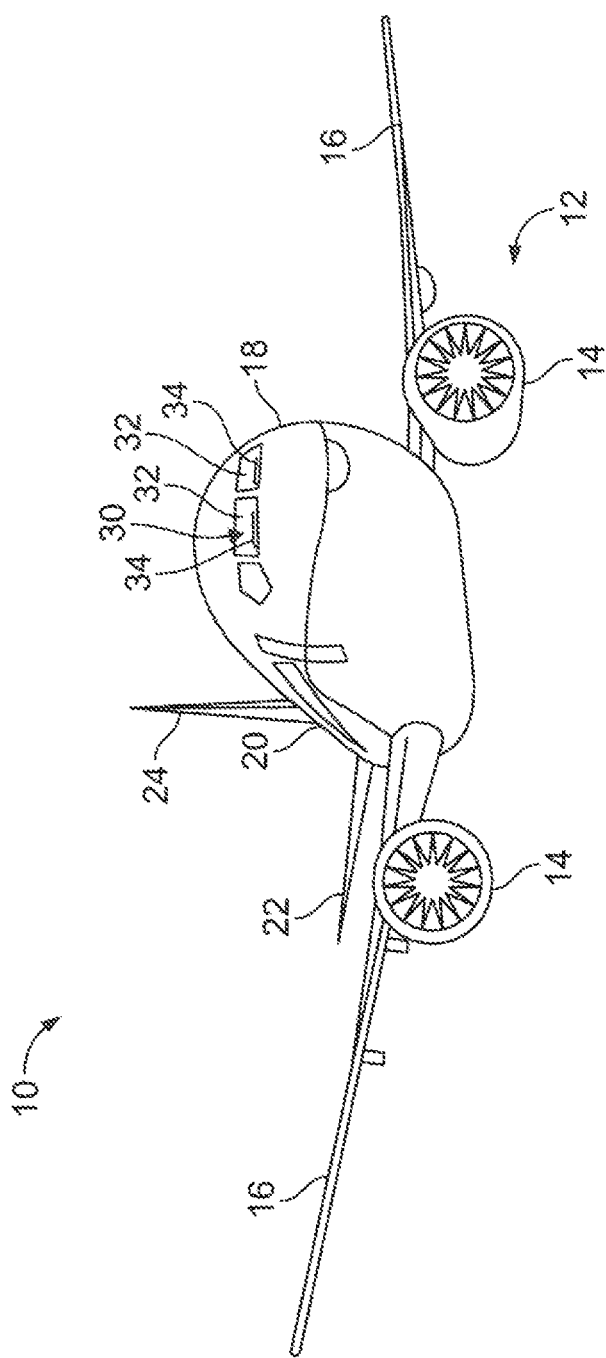
FIG. 1 is a diagrammatic representation of a front perspective view of an aircraft, according to an exemplary embodiment of the present disclosure.

FIG. 1 is a diagrammatic representation of a front perspective view of a vehicle, such as an aircraft 10, according to an exemplary embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an interior cabin, which includes a cockpit 30. The cockpit 30 defines an internal operating environment in which a pilot and associated crew control operation of the aircraft. One or more windshields 32 are used to shield the cockpit 30 from an outside environment. Windshield wipers 34 are operatively positioned on the windshields 32.

Alternatively, instead of an aircraft, embodiments of the present disclosure may be used with various other vehicles, such as automobiles, buses, locomotives and train cars, seacraft, spacecraft, and the like.

Figure 2:
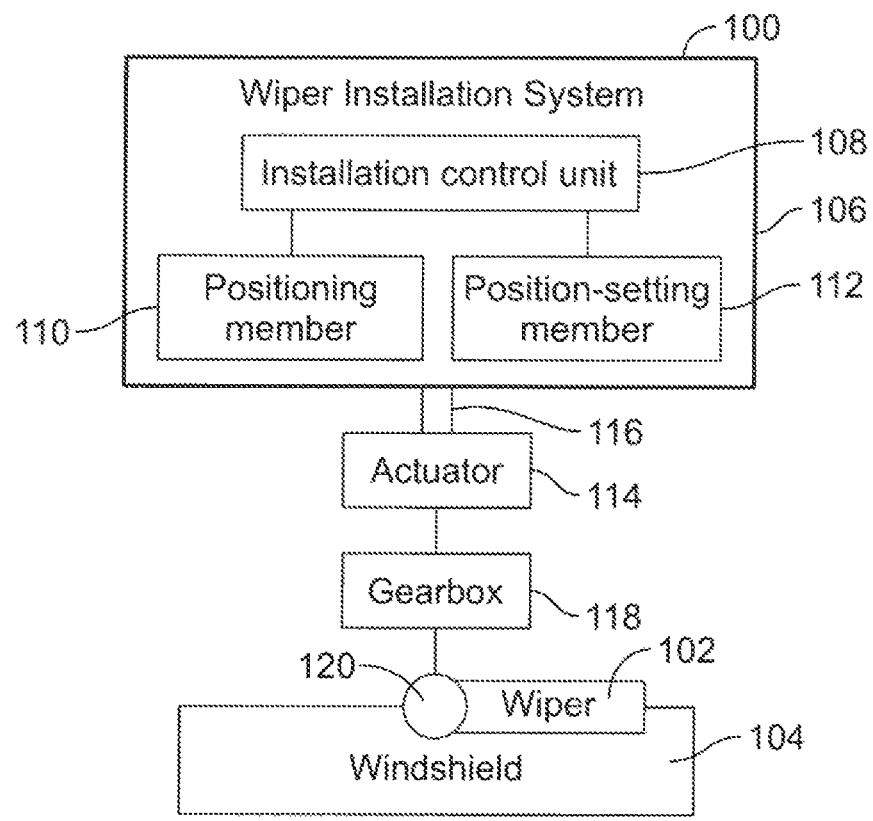
FIG. 2 is a schematic representation of a wiper installation system that is used to install a wiper on a windshield of an aircraft, according to an exemplary embodiment of the present disclosure.

FIG. 2 is a schematic representation of a wiper installation system 100 that is used to install a wiper 102 (such as the wipers 34, shown in FIG. 1) on a windshield 104 (such as the windshields 32, shown in FIG. 1) of an aircraft (such as the aircraft 10, shown in FIG. 1), according to an exemplary embodiment of the present disclosure. The wiper installation system 100 includes a housing 106 that retains an installation control unit 108 that is operatively coupled to a positioning member 110 and a position-setting member 112, such as through wired or wireless connections, circuit boards, electrical traces, and/or the like. The positioning member 110 may be or otherwise include one or more of a knob(s), button(s), switch(es), slider(s), roller(s), and/or the like. Similarly, the position-setting member 112 may be or otherwise include one or more of a knob(s), button(s), switch(es), slider(s), roller(s), and/or the like.

The wiper installation system 100 electrically communicates with an actuator 114 through one or more electrical couplings 116, such as a wired or wireless connection. In at least one embodiment, the actuator 114 is or includes a stepper motor. In at least one other embodiment, the actuator 114 is or includes a linear induction motor, and/or an electric torque motor. The actuator 114 is operatively coupled to a gearbox 118 that is, in turn, operatively connected to a hub 120 of the wiper 102.

In operation, in order to install or rig the wiper 102 in relation to the windshield 104, the positioning member 110 is operated to position the wiper 102 at a plurality of desired positions. For example, the positioning member 110 is operated by an individual to move the wiper 102 to a first position, such as a lower limit position on the windshield 104. The installation control unit 108 receives a positioning signal from the positioning member 110 that corresponds to the desired motion of the wiper 102. The installation control unit 108 then operates the actuator 114 to move the wiper 102 to the desired first position via the gearbox 118 interacting with the hub 120. When the wiper 102 is moved to the desired first position, the positioning member 110 is disengaged to cease motion of the wiper 102. At the desired first position, the position-setting member 112 is then engaged to establish the desired first position, such as the lower limit position. The installation control unit 108 receives a desired first position signal from the position-setting member 112, and then establishes the current position of the wiper 102 in relation to the windshield 104 as the desired first position. The installation control unit 108 then stores the desired first position in memory.

The wiper installation system 100 may be operated to establish additional desired positions, such as a desired second position (for example, an upper limit position), and a park position in a similar fashion. For example, the positioning member 110 is operated by an individual to move the wiper 102 to a second position, such as an upper limit position on the windshield 104. The installation control unit 108 receives a positioning signal from the positioning member 110 that corresponds to the desired motion of the wiper 102. The installation control unit 108 then operates the actuator 114 to move the wiper 102 to the desired second position via the gearbox 118 interacting with the hub 120. When the wiper 102 is moved to the desired second position, the positioning member 110 is disengaged to cease motion of the wiper 102. At the desired second position, the position-setting member 112 is then engaged to establish the desired second position, such as the upper limit position. The installation control unit 108 receives a desired second position signal from the position-setting member 112, and then establishes the current position of the wiper 102 in relation to the windshield 104 as the desired second position. The installation control unit 108 then stores the desired second position in memory.

Further, the positioning member 110 may be operated by an individual to move the wiper 102 to a third position, such as a park position in relation to the windshield 104. The installation control unit 108 receives a positioning signal from the positioning member 110 that corresponds to the desired motion of the wiper 102. The installation control unit 108 then operates the actuator 114 to move the wiper 102 to the desired third position via the gearbox 118 interacting with the hub 120. When the wiper 102 is moved to the desired third position, the positioning member 110 is disengaged to cease motion of the wiper 102. At the desired third position, the position-setting member 112 is then engaged to establish the desired third position, such as the park position. The installation control unit 108 receives a desired third position signal from the position-setting member 112, and then establishes the current position of the wiper 102 in relation to the windshield 104 as the desired third position. The installation control unit 108 then stores the desired third position in memory.

In at least one embodiment, the wiper installation system 100 is removably coupled to the actuator 114, such as through the electrical couplings 116. For example, the installation control unit 108 of the wiper installation system 100 may be electrically tapped into an electrical control system of the windshield wiper via the electrical coupling(s) 116, which may include one or more plugs, receptacles, or the like that are configured to electrically connect into an electrical control interface (for example, wires, circuit boards, or the like) that connect to the actuator 114. After the installation (for example, rigging) process is completed, the wiper installation system 100 may be removed from the electrical control system, so that the electrical control system may be used to control operation of the wiper 102. In this manner, the wiper installation system 100 may be used by an individual outside of the cockpit to properly install or rig the wiper 102 without the need for another individual inside of the cockpit to assist in controlling motion of the wiper 102, for example. Alternatively, the wiper installation system 100 may be part of a windshield wiper control system within a cockpit of an aircraft.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the installation control unit 108 may be or include one or more processors that are configured to control operation of the wiper installation system 100, as described herein.

The installation control unit 108 is configured to execute a set of instructions that are stored in one or more data storage units or elements (such as one or more memories), in order to process data. For example, the installation control unit 108 may include or be coupled to one or more memories. The data storage units may also store data or other information as desired or needed. The data storage units may be in the form of an information source or a physical memory element within a processing machine.

The set of instructions may include various commands that instruct the installation control unit 108 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the installation control unit 108. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the installation control unit 108 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 3:
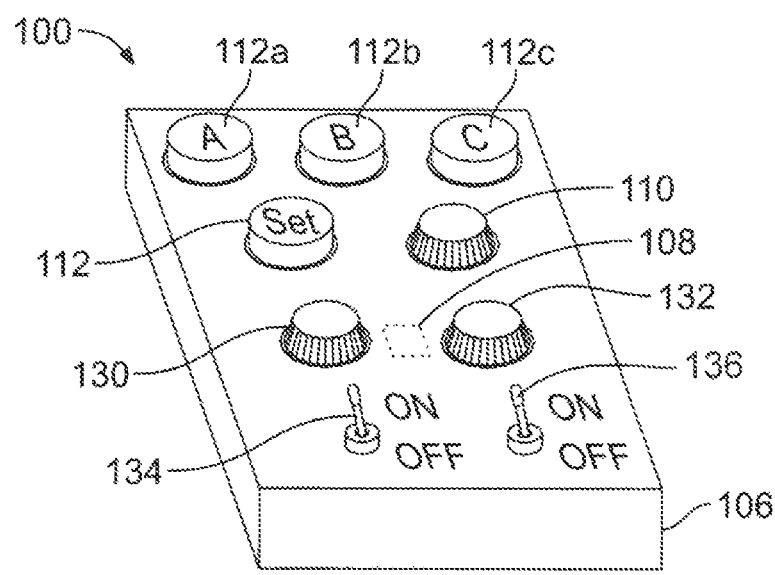
FIG. 3 is a diagrammatic representation of a top perspective view of a wiper installation system, according to an exemplary embodiment of the present disclosure.

FIG. 3 is a diagrammatic representation of a top perspective view of the wiper installation system 100, according to an exemplary embodiment of the present disclosure. The housing 106 may be configured to be held within a hand of an operator. The housing 106 contains the installation control unit 108. As shown, the positioning member 110 may be a rotary control knob, while the position-setting member 112 may be a button. The wiper installation system 100 may also include additional position-setting members 112a, 112b, and 112c, each of which may be specifically designated with respect to a particular desired position of the wiper 102 (shown in FIG. 2) in relation to the windshield 104 (shown in FIGS. 2 and 4, for example). The installation control unit 108 is in communication with the position-setting members 112a, 112b, and 112c.

Referring to FIGS. 2 and 3, in at least one embodiment, the position-setting member 112a is associated with a lower limit of the wiper 102 in relation to the windshield 104, while the position-setting member 112b is associated with an upper limit of the wiper 102 in relation to the windshield 104, and the position-setting member 112c is associated with a park position of the wiper 102 in relation to the windshield 104. Optionally, the position-setting member 112a may be associated with the upper limit or the park position, while the position-setting member 112b may be associated with the lower limit or the park position, and the position-setting member 112c may be associated with the lower limit or the upper limit. The wiper installation system 100 may include additional position-setting members associated with additional positions of the wiper 102 in relation to the windshield 104. In at least one other embodiment, the wiper installation system 100 may not include the position-setting members 112a-112c, but may instead include only the position-setting member 112, which may be used to set various desired positions of the wiper 102 in relation to the windshield 104.

In at least one embodiment, positions may be set by moving the wiper to a desired position, engaging the position-setting member 112 (such as by pressing the set button), and then engaging the desired position-setting member 112a, 112b, or 112c to associate the set position with a particular set position associated with the position-setting members 112a, 112b, or 112c. For example, the set button (as indicated by the position-setting member 112) may be pressed, followed by the A button (as indicated by the position-setting member 112a) being pressed to set and store a particular desired position.

The wiper installation system 100 may also include one or more speed members 130 and 132, such as control knobs, that are in communication with the installation control unit 108. The speed members 130 and 132 may be used to control a speed of the wiper 102 as it is being moved between desired positions. The multiple speed members 130 and 132 may be used with respect to multiple wipers (such as right and left wipers). For example, one speed member 130 may be associated with a left wiper, while another speed member 132 may be associated with a right wiper.

The wiper installation system 100 may also include one or more power members 134, 136 such as control knobs, buttons, toggle switches, or the like, that are in communication with the installation control unit 108. The power members 134, 136 are used to selectively activate and deactivate one or more components of the wiper installation system 100. For example, at least one of the power members 134, 136 may be used to selectively activate and deactivate the wiper installation system 100. The multiple power members 134, 136 may be used with respect to multiple wipers (such as right and left wipers). For example, one power member 134 may be associated with a left wiper, while another power member 136 may be associated with a right wiper.

Figure 4:
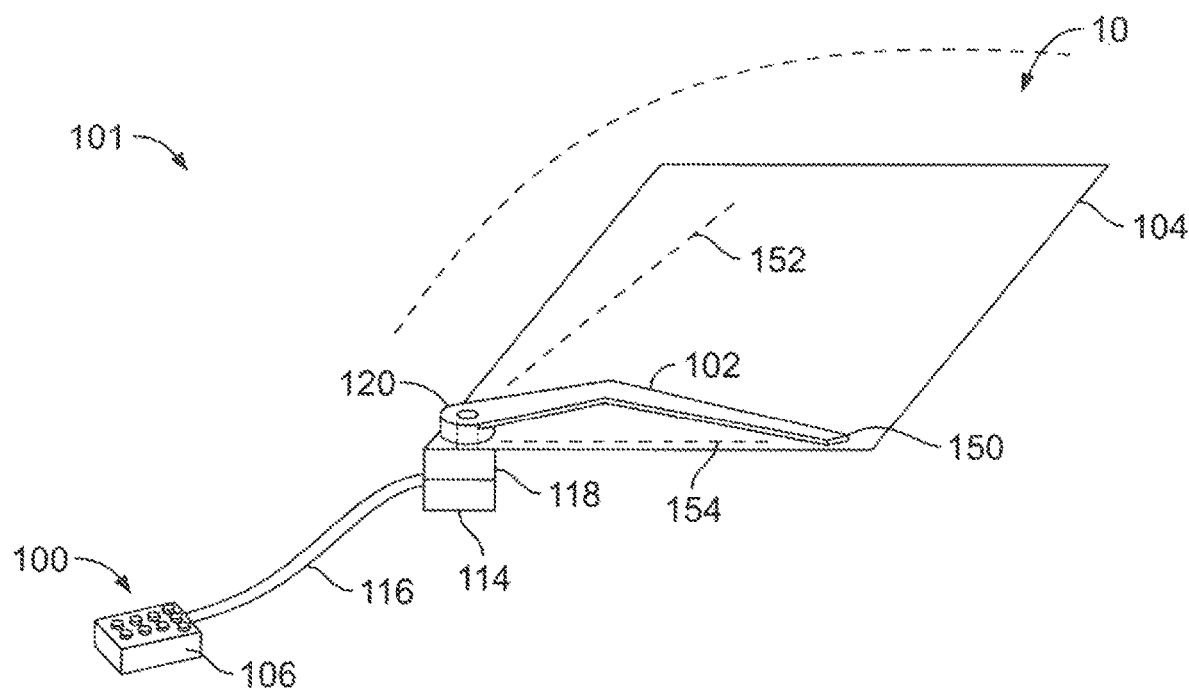
FIG. 4 is a diagrammatic representation of a front perspective view of a wiper installation system operatively coupled to a wiper on a windshield of an aircraft, according to an exemplary embodiment of the present disclosure.

FIG. 4 is a diagrammatic representation of a front perspective view of the wiper installation system 100 operatively coupled to the wiper 102 on the windshield 104 of the aircraft 10, according to an exemplary embodiment of the present disclosure. A wiper system 101 includes the wiper installation system 100 coupled to the wiper 102 on the windshield 104. As described above, the wiper installation system 100 is used to move the wiper 102 between a plurality of desired positions, and to set the desired positions. For example, the wiper installation system 100 is used to set a first desired position 150 (such as a lower limit), a second desired position 152 (such as an upper limit), and a third desired position 154 (such as a park position) for the wiper 102.

Figure 5:
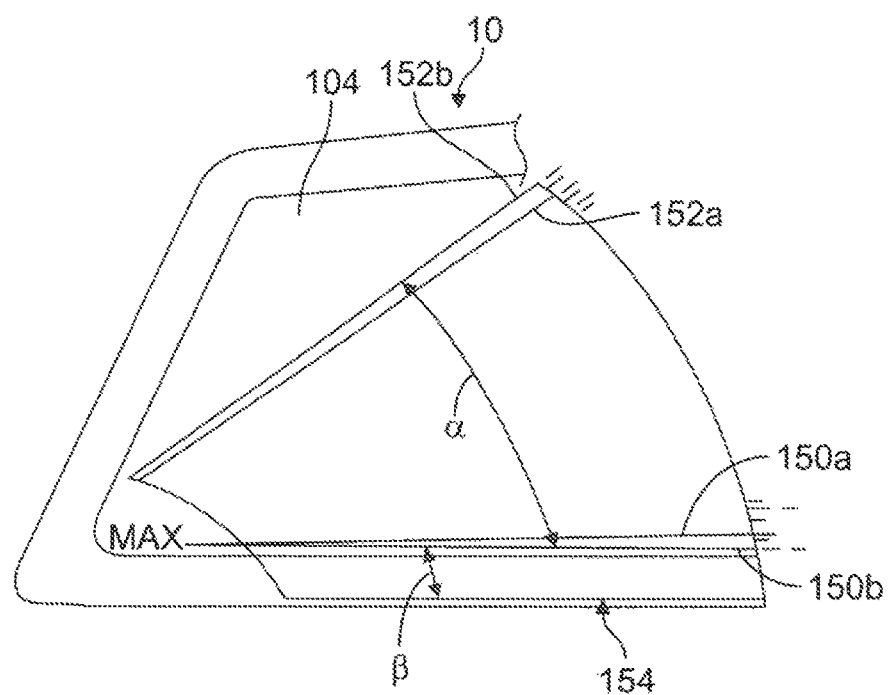
FIG. 5 is a diagrammatic representation of a front view of a windshield of an aircraft, according to an exemplary embodiment of the present disclosure.

FIG. 5 is a diagrammatic representation of a front view of the windshield 104 of the aircraft 10, according to an exemplary embodiment of the present disclosure. Referring to FIGS. 2-5, the wiper installation system 100 may be used to set a lower limit minimum position 150a, a lower limit maximum position 150b, an upper limit minimum position 152a, an upper limit maximum position 152b, and the park position 154. The maximum and minimum positions are defined because a wiper moves back and forth at a relatively high velocity, and may not stop at the exact same spot with each sweep due to friction on the windshield (which may change based on different environmental conditions, such as rain, ice, condensation, etc.). The lower limit minimum position 150a defines a minimum lower position at which the wiper 102 is to reach during operation. The lower limit maximum position defines 150b defines a maximum lower position at which the wiper 102 is to reach during operation. The upper limit minimum position 152a defines a minimum upper position at which the wiper 102 is to reach during operation. The upper limit maximum position 152b defines a maximum upper position at which the wiper 102 is to reach during operation.

As shown in FIG. 5, an angular difference $\alpha$ between the lower limit maximum position 150b and the upper limit maximum position 152b may be 37.3 degrees. Optionally, the angular difference $\alpha$ may be greater or less than 37.3 degrees. Further, the angular difference $\beta$ between the lower limit maximum position 150b and the park position 154 may be 8 degrees. Optionally, the angular difference $\beta$ may be greater or less than 8 degrees.

Figure 6:
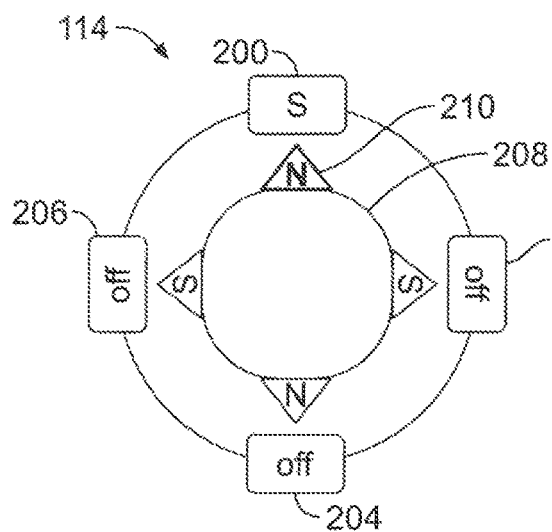
FIG. 6 is a schematic representation of an actuator in a first position, according to an exemplary embodiment of the present disclosure.
Figure 7:
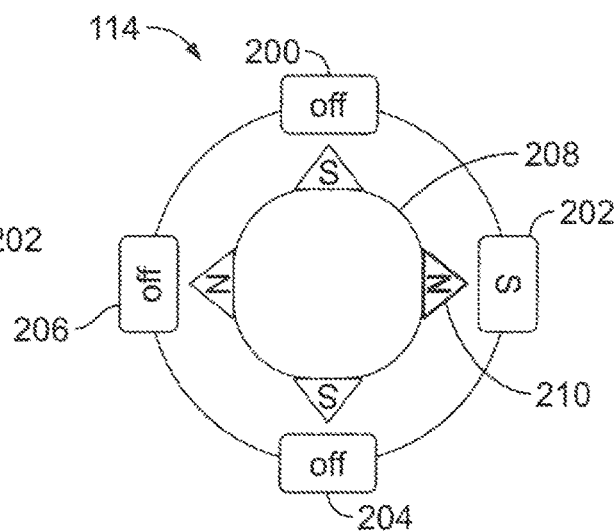
FIG. 7 is a schematic representation of an actuator in a second position, according to an exemplary embodiment of the present disclosure.
Figure 8:
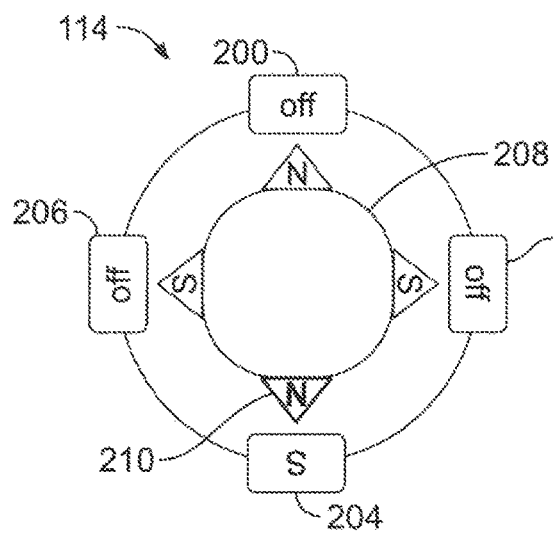
FIG. 8 is a schematic representation of an actuator in a third position, according to an exemplary embodiment of the present disclosure.
Figure 9:
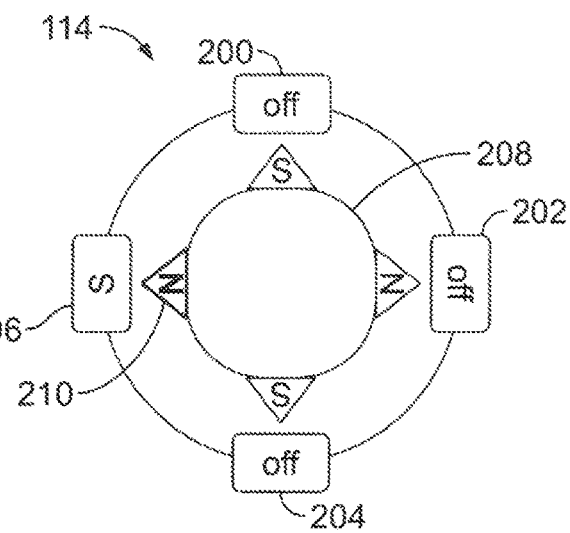
FIG. 9 is a schematic representation of an actuator in a fourth position, according to an exemplary embodiment of the present disclosure.

FIG. 6 is a schematic representation of the actuator 114 in a first position, according to an exemplary embodiment of the present disclosure. FIG. 7 is a schematic representation of the actuator 114 in a second position. FIG. 8 is a schematic representation of the actuator in a third position. FIG. 9 is a schematic representation of the actuator 114 in a fourth position.

Referring to FIGS. 6-9, the actuator 114 may be a stepper motor. A stepper motor is a brushless direct current motor that includes a round magnetic rotor with polarized alternating teeth surrounded by multiple electromagnets that are organized in phases. The actuator 114, as a stepper motor, may include four electromagnets 200, 202, 204, and 206. A magnetically-polarized rotor 208 is positioned between the electromagnets 200, 202, 204, and 206. Each of the electromagnets 200-206 is selectively energized and de-energized to move the rotor 208 between the four positions shown in FIGS. 6-9. The rotor 208 rotates one step when pole tooth 210 is attracted to an energized electromagnet 200, 202, 204, or 206 of opposite polarity. When the electromagnets 200-206 are selectively energized and de-energized in sequence (as shown in FIGS. 6-9), the rotor continuously moves according to such sequence. The rotor 208 is operatively coupled to the gear box 118 (shown in FIGS. 2 and 4) to effect a corresponding motion of the wiper 102 (shown in FIGS. 2 and 4).

Referring to FIGS. 2, 4, and 6-9, in at least one embodiment, the actuator 114 is mounted to an input shaft of the gearbox 118, while the hub 120 of the wiper 102 is coupled to an output shaft of the gearbox 118. The gearbox 118 may be a planetary gearbox that includes epi-cyclic gears inside a ring gear. In at least one embodiment, a gear arm (also known as a carrier) is free to rotate, holds the gears, and revolves the gear system around a central sun gear. The planet gears mesh with the inner edge of the ring gear and also with the sun gear located at the center of the ring gear. A planetary gearbox allows for a relatively compact, small, and light stepper motor to be used.

In at least one other embodiment, the actuator 114 may be a linear induction motor and/or a torque motor, instead of a stepper motor. A linear induction motor is an alternating current, asynchronous linear motor. A linear induction motor has a finite primary or secondary length, which generates end-effects. In this embodiment the actuator 114 may also serve as a park lock when stalled against a parking block, for example. A torque motor is a type of electric motor that is operable even while stalled, such as when a rotor of the torque motor is blocked from turning. In this condition, the torque motor applies a steady torque to a load.

Embodiments of the present disclosure provide a wiper system 101 (shown in FIG. 4, for example) for the aircraft 10. The wiper system 101 includes an actuator 114, such as a stepper motor, operatively coupled to the wiper 102. The wiper installation system 100 is used to set various positions of the wiper 102 in relation to the windshield 104, as described herein. After the desired positions of the wiper 102 are set, the wiper installation system 100 may be removed, and the actuator 114 may be coupled to a separate control unit (not shown) and source of power to control operation of the wiper 102.

Figure 10:
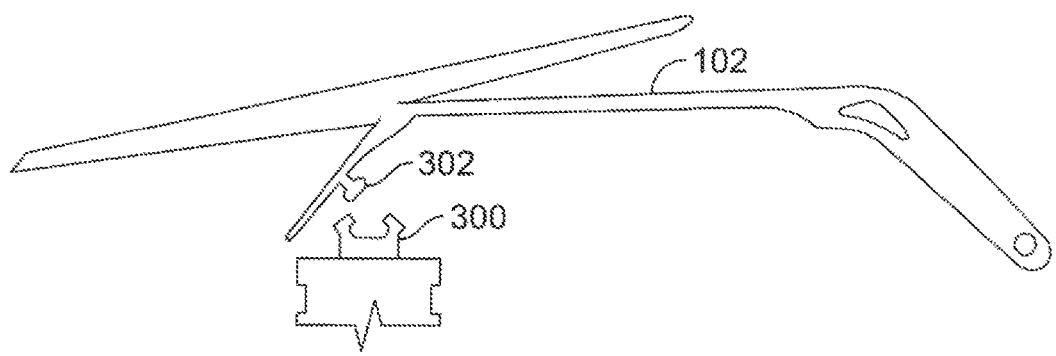
FIG. 10 is a schematic representation of a front view of a wiper in relation to a park lock, according to an exemplary embodiment of the present disclosure.

FIG. 10 is a schematic representation of a front view of the wiper 102 in relation to a park lock 300, according to an exemplary embodiment of the present disclosure. The park lock 300 may be a latch that is configured to securely lock onto a complementary protuberance 302 (such as a hook, barb, clasp, stud, or the like) of the wiper 102 in the park position. In this manner, the wiper 102 may be passively secured in the park position, so that the actuator 114 need not be active in order to maintain the wiper in the park position. As such, power may be conserved when the park lock 300 secures the wiper 102 in the park position.

In at least one embodiment, the park lock 300 may be or include a ratchet gear and pawl mechanism, a solenoid lock/bolt, and/or the like. For example, a ratchet gear may be directly attached to a shaft of a stepper motor. During operation, the ratchet gear and pawl are not in contact, so the shaft is free to rotate. Once the windshield wiper 102 is stowed away and power is turned off, the solenoid mechanism forces the pawl toward the ratchet gear, thereby preventing the system from rotating. In at least one other embodiment, when the power to the motor is turned off, a solenoid bolt mechanism directly locks with the ratchet gear.

In at least one other embodiment the locking mechanism may be integrally formed with an actuator. For example, an electric torque motor may be configured to operate normally while in a stalled configuration. The stalled configuration may be used as a parking mechanism.

Figure 11:
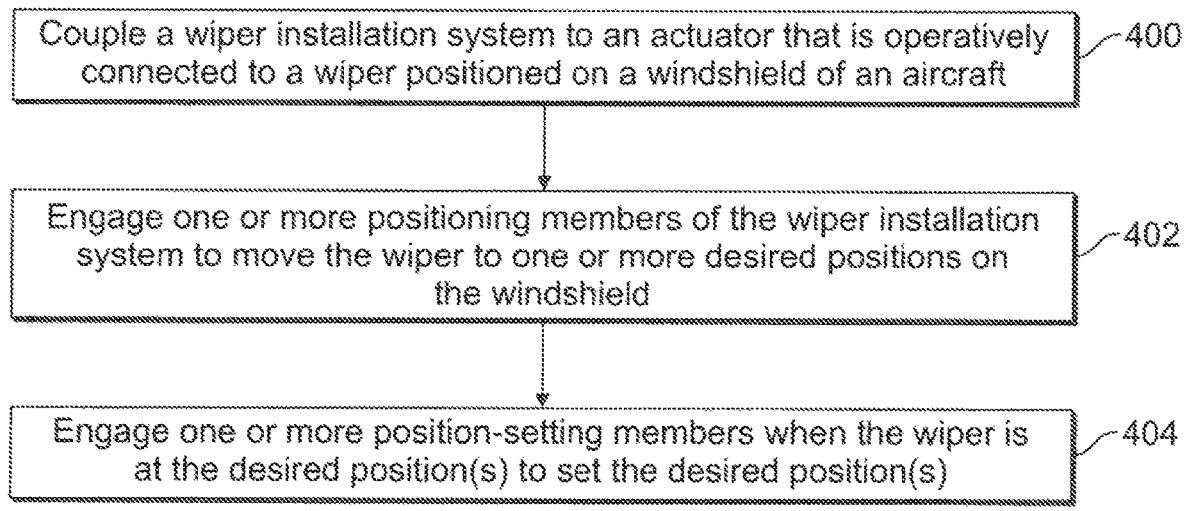
FIG. 11 illustrates a flow chart of a method of installing a wiper in relation to a windshield of an aircraft, according to an exemplary embodiment of the present disclosure.

FIG. 11 illustrates a flow chart of a method of installing a wiper in relation to a windshield of an aircraft, according to an exemplary embodiment of the present disclosure. Referring to FIGS. 1 and 11, the method begins at 400, at which the wiper installation system 100 is coupled to the actuator 114 (such as through one or more electrical couplings 116) that is operatively connected to the wiper 102 positioned on the windshield 104 of the aircraft 10 (shown in FIG. 1). Next, at 402, one or more positioning members 110 of the wiper installation system 100 are engaged or otherwise used to move the wiper 102 to one or more desired positions on the windshield 104. At 404, one or more position-setting members 112 are engaged or otherwise used when the wiper 102 is at the desired position(s) to set the desired position(s) of the wiper 102 in relation to the windshield 104.

As described herein, embodiments of the present disclosure provide simple and efficient systems and methods of installing a windshield wiper on a windshield of an aircraft. Further, embodiments of the present disclosure provide a quick and easy process of installing a wiper in relation to a windshield of an aircraft. The wiper installation systems and methods described herein allow for precise positioning and setting of wiper positions, repeatability of movements, quick starting and stopping, and, in general, eliminate or otherwise reduce rigging failures (such as jiggling and over-sweeps).

The windshield wiper systems and methods described herein simplify a wiper rigging process. An individual may utilize the windshield wiper systems and methods to define various positions (such as a park position, an upper limit, and a lower limit).

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A windshield wiper installation system cooperating with a wiper and configured to install the wiper on a windshield of an aircraft, the windshield wiper installation system comprising:
    a housing;
    an installation control unit contained within the housing;
    at least one positioning member secured to the housing, wherein the installation control unit is operatively coupled to the at least one positioning member; and
    at least one position-setting member secured to the housing, wherein the installation control unit is operatively coupled to the at least one position-setting member,
    wherein the at least one positioning member is configured to move the wiper to one or more desired positions on the windshield, and wherein the at least one position-setting member is configured to set the one or more desired positions when the wiper is at the one or more desired positions.

2. The windshield wiper installation system of claim 1, wherein the one or more desired positions comprise a plurality of desired positions.

3. The windshield wiper installation system of claim 2, wherein the plurality of desired positions comprise a lower limit position of the wiper on the windshield, an upper limit position of the wiper on the windshield, and a park position of the wiper in relation to the windshield.

4. The windshield wiper installation system of claim 3, wherein the wiper is secured in the park position via a park lock.

5. The windshield wiper installation system of claim 1, wherein the installation control unit is in communication with an actuator that is coupled to the wiper through a gearbox, wherein the installation control unit is configured to operate the actuator to move the wiper based on signals received from the at least one positioning member.

6. The windshield wiper installation system of claim 5, wherein the installation control unit is configured to removably couple to the actuator through one or more electrical couplings.

7. The windshield wiper installation system of claim 5, wherein the actuator comprises a stepper motor.

8. The windshield wiper installation system of claim 1, wherein the at least one position-setting member comprises:
    a first position-setting member associated with a first desired position;
    a second position-setting member associated with a second desired position; and
    a third position-setting member associated with a third desired position.

9. The windshield wiper installation system of claim 1, further comprising at least one speed member that is configured to control a speed of the wiper.

10. The windshield wiper installation system of claim 1, further comprising at least one power member that is configured to selectively activate and deactivate at least a portion of the windshield wiper installation system.

11. An aircraft comprising:
    a fuselage including an internal cockpit;
    a windshield that shields the internal cockpit from an outside environment;
    at least one wiper mounted to the windshield;
    at least one actuator that is coupled to the at least one wiper through at least one gearbox; and
    a windshield wiper installation system that is configured to be used to install the at least one wiper on the windshield of the aircraft, the windshield wiper installation system comprising:
        a housing;
        an installation control unit contained within the housing, wherein the installation control unit is configured to operate the at least one actuator to move the at least one wiper over the windshield;
        at least one positioning member secured to the housing, wherein the installation control unit is operatively coupled to the at least one positioning member; and
        at least one position-setting member secured to the housing, wherein the installation control unit is operatively coupled to the at least one position-setting member,
        wherein the at least one positioning member is configured to move the at least one wiper to a plurality of desired positions on the windshield, wherein the at least one position-setting member is configured to set the plurality of desired positions when the at least one wiper is at the plurality of desired positions, and wherein the plurality of desired positions comprise a lower limit position of the at least one wiper on the windshield, an upper limit position of the at least one wiper on the windshield, and a park position of the at least one wiper in relation to the windshield.

12. The aircraft of claim 11, further comprising at least one park lock, wherein the at least one wiper is secured in the park position via the at least one park lock.

13. The aircraft of claim 11, wherein the installation control unit is configured to removably couple to the at least one actuator through one or more electrical couplings.

14. The aircraft of claim 11, wherein the at least one actuator comprises at least one stepper motor.

15. The aircraft of claim 11, wherein the at least one position-setting member comprises:
- a first position-setting member associated with the lower limit position;
- a second position-setting member associated with the upper limit position; and
- a third position-setting member associated with the park position.

16. The aircraft of claim 11, wherein the wiper installation system further comprises at least one speed member that is configured to control a speed of the at least one wiper.

17. The aircraft of claim 11, wherein the wiper installation system further comprises at least one power member that is configured to selectively activate and deactivate at least a portion of the windshield wiper installation system.

18. A windshield wiper installation system that is configured to be used to install a wiper on a windshield of an aircraft, the windshield wiper installation system comprising:
- an installation control unit;
- at least one positioning member, wherein the installation control unit is operatively coupled to the at least one positioning member; and
- at least one position-setting member, wherein the installation control unit is operatively coupled to the at least one position-setting member,
- wherein the at least one positioning member is configured to move the wiper to one or more desired positions on the windshield, and wherein the at least one position-setting member is configured to set the one or more desired positions when the wiper is at the one or more desired positions.

19. The windshield wiper installation system of claim 18, wherein the installation control unit is in communication with an actuator that is configured to be coupled to the wiper through a gearbox, wherein the installation control unit is configured to operate the actuator to move the wiper based on signals received from the at least one positioning member.

20. The windshield wiper installation system of claim 18, wherein the at least one position-setting member comprises:
- a first position-setting member associated with a first desired position;
- a second position-setting member associated with a second desired position; and
- a third position-setting member associated with a third desired position.

* * * * *